United States Patent
Morita et al.

(10) Patent No.: US 11,409,886 B2
(45) Date of Patent: Aug. 9, 2022

(54) PROGRAM VERIFICATION SYSTEM, METHOD, AND PROGRAM

(71) Applicant: NEC Corporation, Tokyo (JP)

(72) Inventors: Yusuke Morita, Tokyo (JP); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 190 days.

(21) Appl. No.: 16/635,439

(22) PCT Filed: Jul. 31, 2017

(86) PCT No.: PCT/JP2017/027729
§ 371 (c)(1),
(2) Date: Jan. 30, 2020

(87) PCT Pub. No.: WO2019/026137
PCT Pub. Date: Feb. 7, 2019

(65) Prior Publication Data
US 2020/0184079 A1   Jun. 11, 2020

(51) Int. Cl.
*G06F 7/04* (2006.01)
*G06F 21/57* (2013.01)
(Continued)

(52) U.S. Cl.
CPC ........ *G06F 21/577* (2013.01); *G06F 9/44589* (2013.01); *G06F 21/121* (2013.01); *G06F 21/53* (2013.01); *G06F 21/64* (2013.01)

(58) Field of Classification Search
CPC .. G06F 21/577; G06F 9/44589; G06F 21/121; G06F 21/53; G06F 21/64; G06F 21/56
See application file for complete search history.

(56) References Cited

U.S. PATENT DOCUMENTS

| | | | | |
|---|---|---|---|---|
| 6,067,575 A | * | 5/2000 | McManis | G06F 9/5055 719/313 |
| 7,398,532 B1 | * | 7/2008 | Barber | G06F 21/53 718/100 |

(Continued)

FOREIGN PATENT DOCUMENTS

| | | |
|---|---|---|
| JP | 2005-032185 A | 2/2005 |
| JP | 2007-122745 A | 5/2007 |

(Continued)

OTHER PUBLICATIONS

International Search Report of PCT/JP2017/027729 dated Oct. 24, 2017.

*Primary Examiner* — Trong H Nguyen

(57) ABSTRACT

A program verification system of the invention includes program verification means 51 for verifying whether a verification target program input as a program operating in a secure environment does not include a program execution function which is a function of executing a new program in the same environment by a command in the corresponding program and/or whether the verification target program or a protection mechanism of the secure environment as an operation source of the verification target program includes an external input attack defense function which is a function of defending against an attack caused by an external data input during execution of the program; and signature means 52 for giving a signature to the program based on a result of the verification by the program verification means 51.

9 Claims, 13 Drawing Sheets

(51) Int. Cl.
*G06F 9/445* (2018.01)
*G06F 21/12* (2013.01)
*G06F 21/53* (2013.01)
*G06F 21/64* (2013.01)

(56) References Cited

U.S. PATENT DOCUMENTS

| | | | |
|---|---|---|---|
| 10,033,747 B1* | 7/2018 | Paithane | G06F 21/566 |
| 2004/0153644 A1* | 8/2004 | McCorkendale | G06F 21/56 |
| | | | 713/156 |
| 2007/0074169 A1* | 3/2007 | Chess | G06F 21/54 |
| | | | 717/126 |
| 2008/0168533 A1* | 7/2008 | Ozaki | G06F 21/577 |
| | | | 726/1 |
| 2011/0162072 A1* | 6/2011 | Hay | H04L 67/02 |
| | | | 726/25 |
| 2013/0111605 A1* | 5/2013 | Maeda | G06F 21/14 |
| | | | 726/27 |
| 2014/0380513 A1* | 12/2014 | Dotan | G06F 9/455 |
| | | | 726/30 |
| 2015/0067830 A1 | 3/2015 | Johansson et al. | |

FOREIGN PATENT DOCUMENTS

| | | |
|---|---|---|
| JP | 2008-158686 A | 7/2008 |
| JP | 2009-521737 A | 6/2009 |
| JP | 2014-089652 A | 5/2014 |
| JP | 2016-534460 A | 11/2016 |
| WO | 2012/160760 A1 | 11/2012 |

* cited by examiner

PROGRAM VERIFICATION SYSTEM, METHOD, AND PROGRAM

CROSS REFERENCE TO RELATED APPLICATIONS

This application is a National Stage of International Application No. PCT/JP2017/027729 filed Jul. 31, 2017.

TECHNICAL FIELD

The invention relates to a program verification system, a program verification method, and a program verification program for preventing an attack from a malicious program in a secure environment.

BACKGROUND ART

In recent years, as a security solution for IoT, a technology for realizing a safe execution environment for applications using hardware and software, such as a trusted execution environment (TEE) technology, has attracted attention.

As an example of the TEE, an execution environment of a program or the like is separated into a normal execution environment (hereinafter, referred to as a non-secure environment) and an execution environment in which a predetermined safety measure is taken (hereinafter, referred to as a secure environment), and then a program placed in the secure environment (hereinafter, referred to as a secure program) is regulated, or access from the non-secure environment to the secure environment is prohibited (for example, PTL 1). By imposing such restrictions, confidential information and programs placed in the secure environment are protected from an external attack.

In addition, for example, in PTL 2, the safety of a code is determined based on predetermined safety policies in advance for a script program, and if the code is not safe, the code is rejected or execution is prevented if a violation of the safety policies occurs when a script program thereof is executed.

CITATION LIST

Patent Literature

PTL 1: Japanese Patent Application Laid-Open No. 2014-089652
PTL 2: Japanese Patent Application Laid-Open No. 2009-521737

SUMMARY OF INVENTION

Technical Problem

FIG. 14 is a conceptual diagram of a safe execution environment. As illustrated in FIG. 14, in many TEEs, a safe execution environment is constructed by separating an execution environment into a non-secure environment and a secure environment, placing only a secure program of which the safety is guaranteed by a provider or the like in the secure environment, and then prohibiting access from the non-secure environment to the secure environment. Even if a malicious process (malware or the like) is placed in the non-secure environment, since processes and data in the secure environment are not attacked, normal operations can be maintained.

In this way, the safety of many secure programs is covered by technical static verification and legal guarantees. However, legal deterrence such as contracts and on-boarding is unlikely to work for malicious people.

As illustrated in FIG. 15, once a malicious program is placed in the secure environment, it is difficult to detect maliciousness from the outside or to remove the program. This is because it is difficult to receive interference from the outside due to the protection mechanism of the secure environment as the above-described TEE. For this reason, if a secure program in which no maliciousness can be seen at the time of verification but maliciousness is revealed during operation is placed, there is a risk of being unilaterally attacked. Therefore, it is important not to operate a secure program, which can be malicious in the secure environment even if the maliciousness is not revealed at the time of verification, in the secure environment (not to place or not to permit execution).

As an example of the maliciousness unrevealed at the time of verification, there is a Drive by download attack. As illustrated in FIG. 16, it is conceivable that no maliciousness can be seen at the time of verification before being placed, but the program is mutated into a malicious secure program by an external data input or the like during the operation process to give an attack. The example illustrated in FIG. 16 is an example in which a program appears to securely keep confidential information obtained from a server in a terminal by performing communication between the terminal and the server during verification, but the program is mutated into a malicious program during operation. In this example, a program that has been verified in advance downloads a part of malware execution data as confidential information from a predetermined server during operation, and incorporates the execution data into a secure program by using the vulnerability of the secure program and the protection mechanism of the secure environment (transfer control to the execution data) so as to be mutated into the malware.

Moreover, as illustrated in FIG. 17, it is conceivable that no maliciousness can be seen at the time of verification before being placed, but a malicious secure program is newly activated by an external data input or the like during the operation process to give an attack. The example illustrated in FIG. 17 is an example in which a program appears to securely keep confidential information obtained from a server in a terminal by performing communication between the terminal and the server during verification, but the program downloads and activates a malicious program during operation. In this example, a program that has been verified in advance downloads malware execution data as confidential information from a predetermined server during operation to file the malware execution data, and activates the execution data as if the execution data were an authorized execution file by using the vulnerability of the secure program and the protection mechanism of the secure environment.

Because legal deterrence cannot physically limit the actions of malicious attackers, who intentionally place or execute programs containing unrevealed maliciousness, stronger technical deterrence is required. However, it is difficult to detect maliciousness or defend against an attack using the methods described in PTLs 1 and 2 for the secure program that changes presence or absence of maliciousness dynamically by an external input.

In view of the above problems, an object of the invention is to provide a program verification system, a program verification method, and a program verification program which can prevent an attack with maliciousness that becomes revealed in a secure environment.

Solution to Problem

A program verification system of the invention includes program verification means for verifying whether a verification target program input as a program operating in a secure environment does not include a program execution function which is a function of executing a new program in the same environment by a command in the corresponding program and/or whether the verification target program or a protection mechanism of the secure environment as an operation source of the verification target program includes an external input attack defense function which is a function of defending against an attack caused by an external data input during execution of the program; and signature means for giving a signature to the program based on a result of the verification by the program verification means.

A program verification method of the invention, by an information processing device, includes verifying whether a verification target program input as a program operating in a secure environment does not include a program execution function which is a function of executing a new program in the same environment by a command in the corresponding program and/or whether the verification target program or a protection mechanism of the secure environment as an operation source of the verification target program includes an external input attack defense function which is a function of defending against an attack caused by an external data input during execution of the program; and giving a signature to the program based on a result of the verification.

A program verification program causes a computer to execute a process of verifying whether a verification target program input as a program operating in a secure environment does not include a program execution function which is a function of executing a new program in the same environment by a command in the corresponding program and/or whether the verification target program or a protection mechanism of the secure environment as an operation source of the verification target program includes an external input attack defense function which is a function of defending against an attack caused by an external data input during execution of the program; and a process of giving a signature to the program based on a result of the verification.

Advantageous Effects of Invention

According to the invention, it is possible to prevent an attack with maliciousness that becomes revealed in a secure environment.

FIG. It depicts a flowchart illustrating an example of the operation of the program verification system 10 of the third exemplary embodiment.

Figure 8:
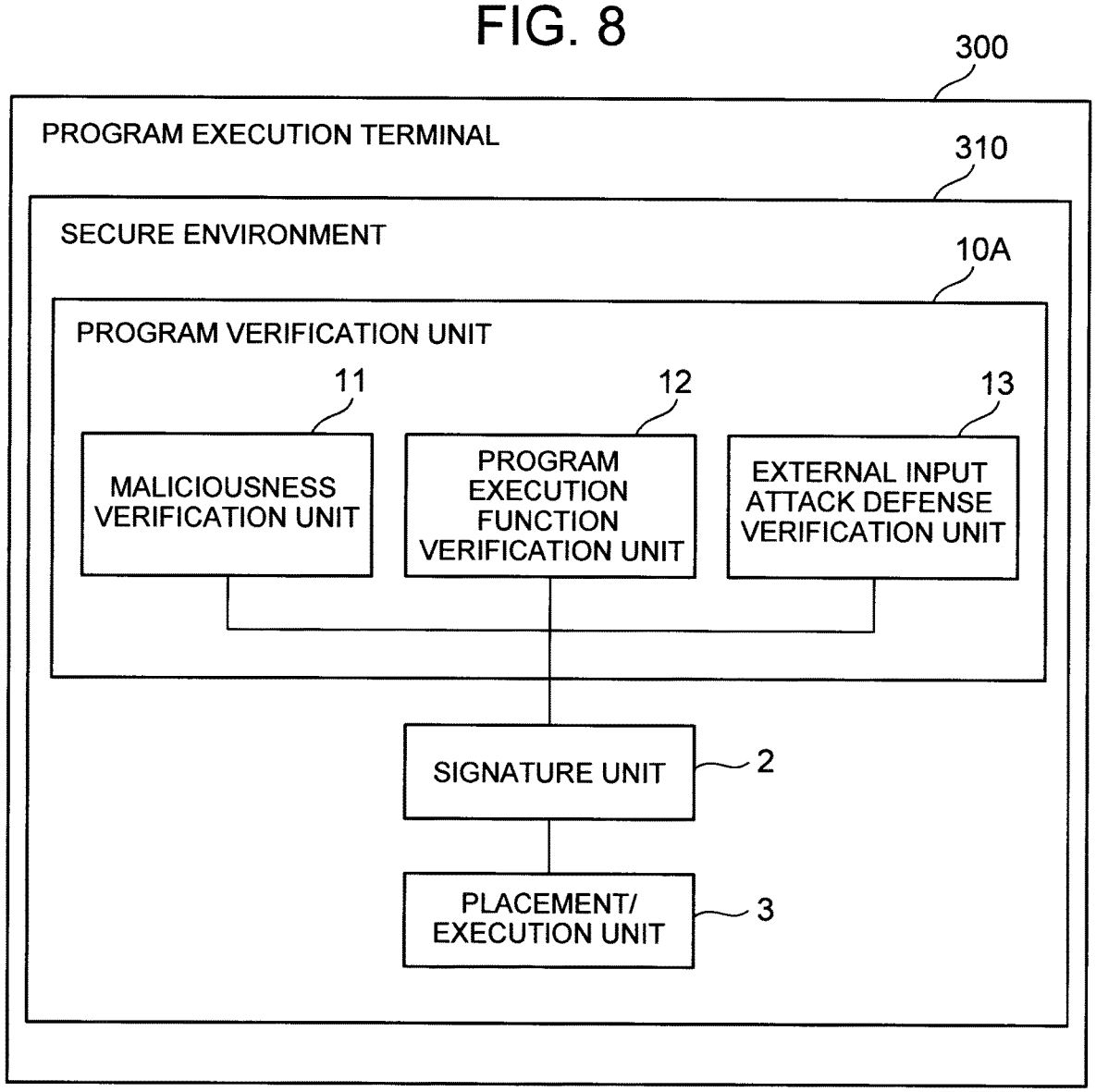

FIG. 8 It depicts a block diagram illustrating an example of applying the program verification system 10 to a program execution terminal.

Figure 9:
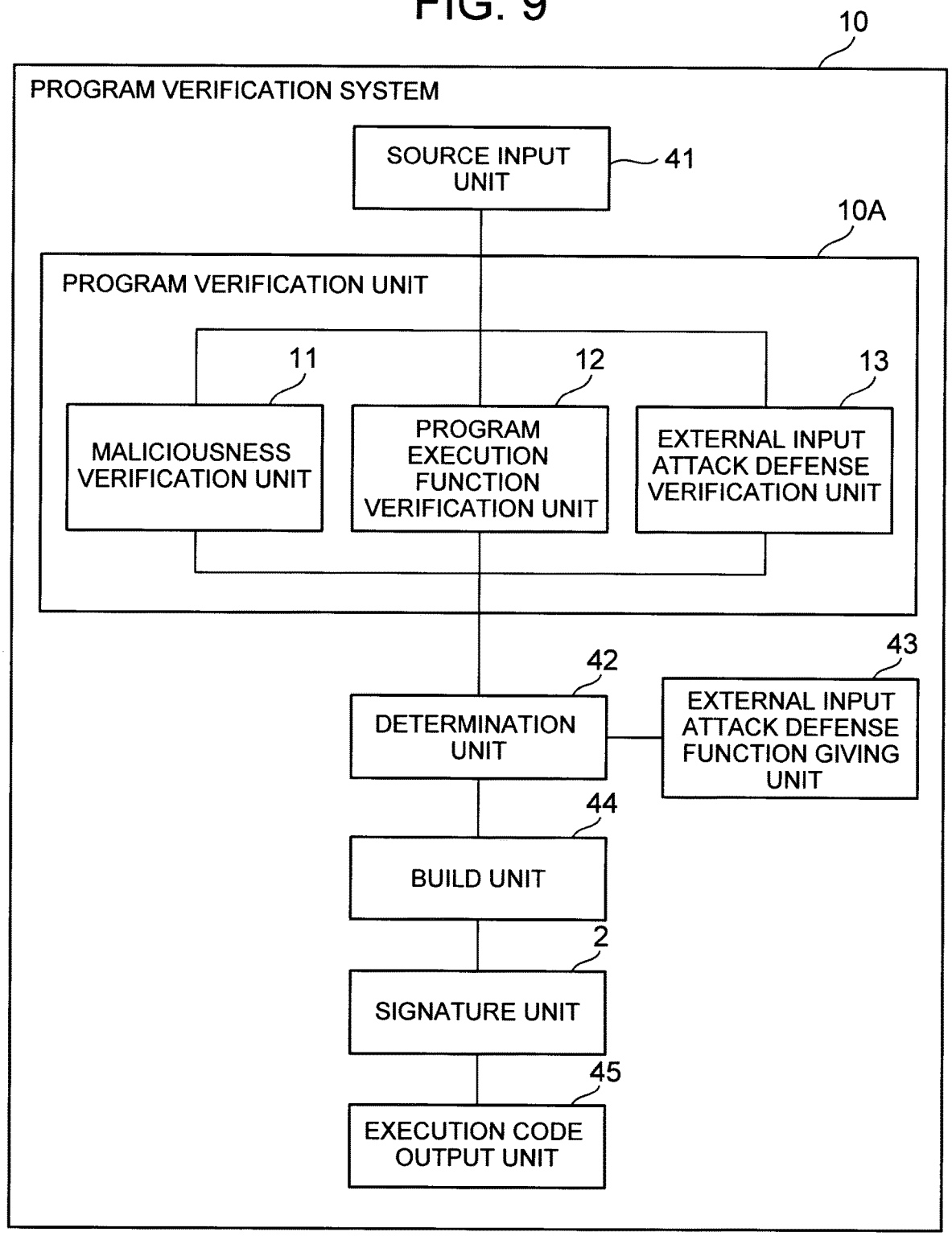

FIG. 9 It depicts a block diagram illustrating another configuration example of the program verification system 10.

Figure 10:
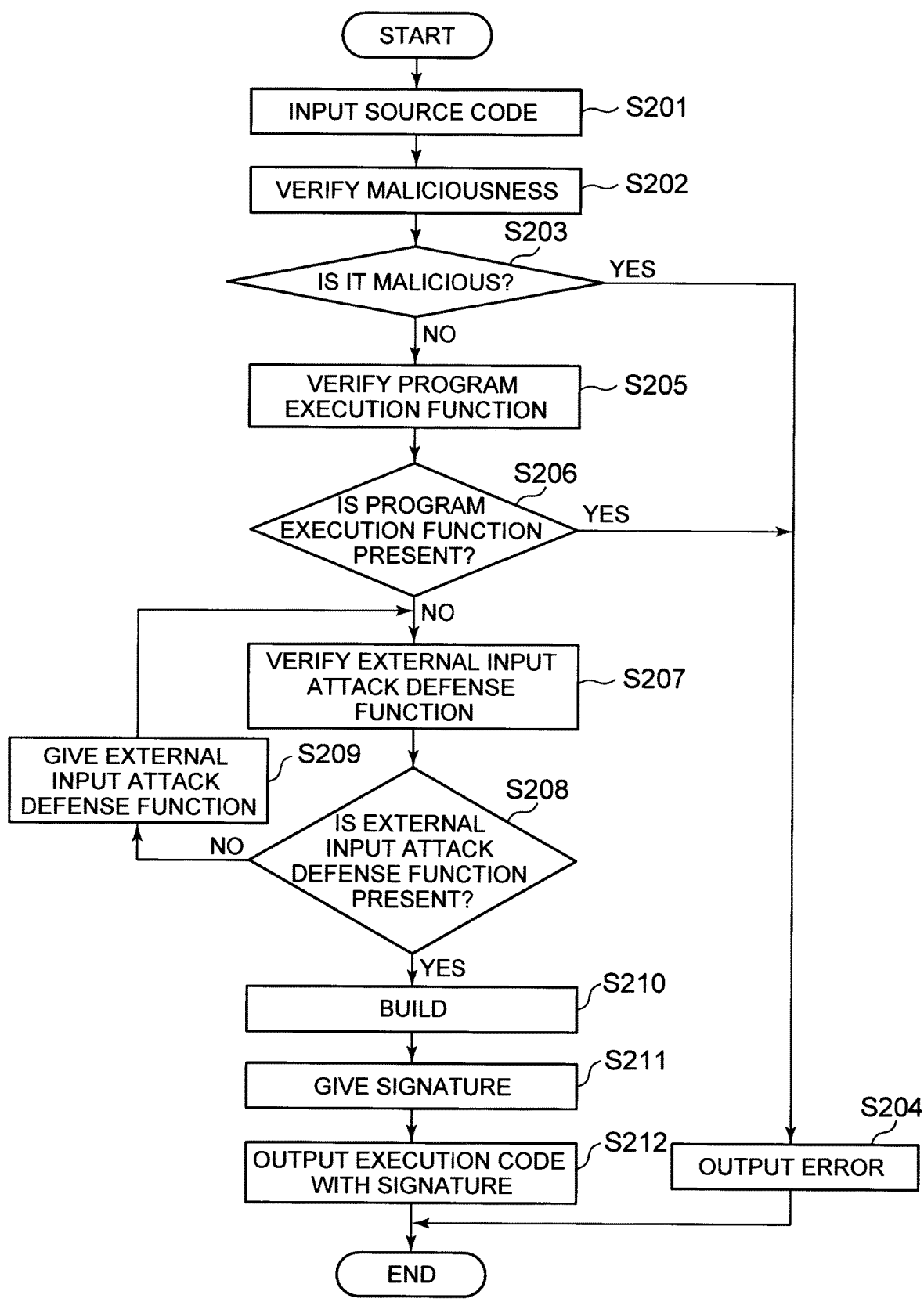

FIG. 10 It depicts a flowchart illustrating an example of the operation of the program verification system 10 illustrated in FIG. 9.

Figure 11:
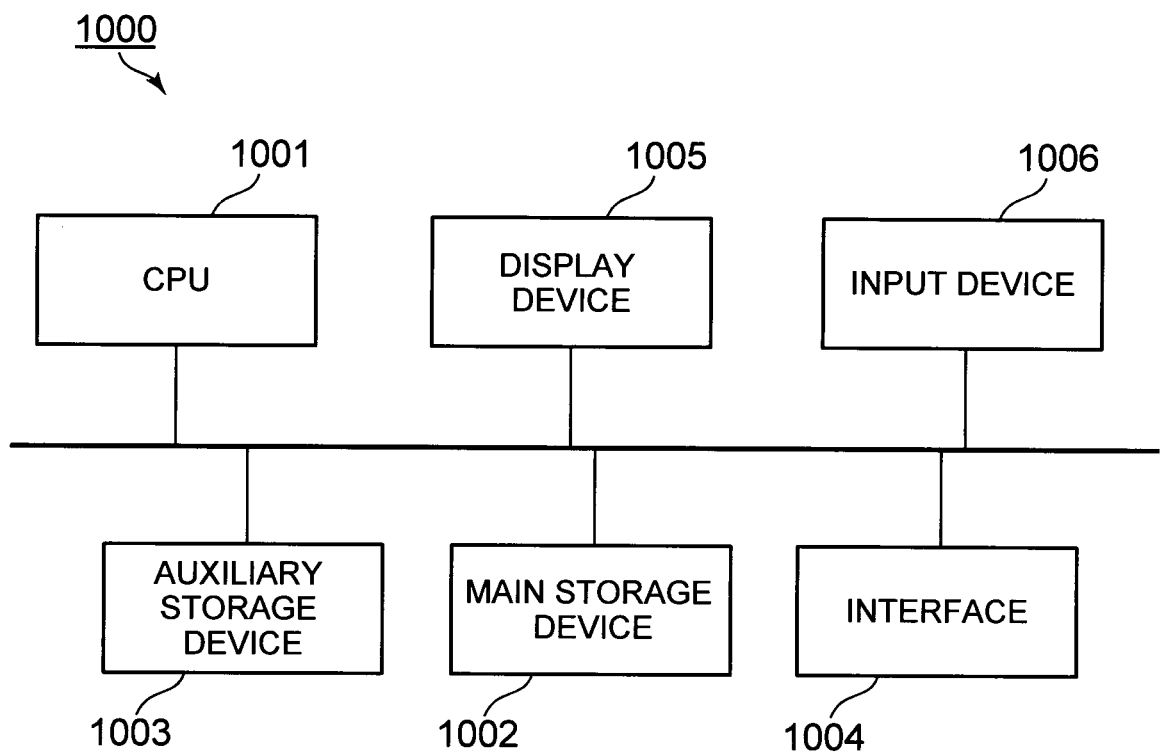

FIG. 11 It depicts a schematic block diagram illustrating a configuration example of a computer according to each exemplary embodiment of the invention.

Figure 12:
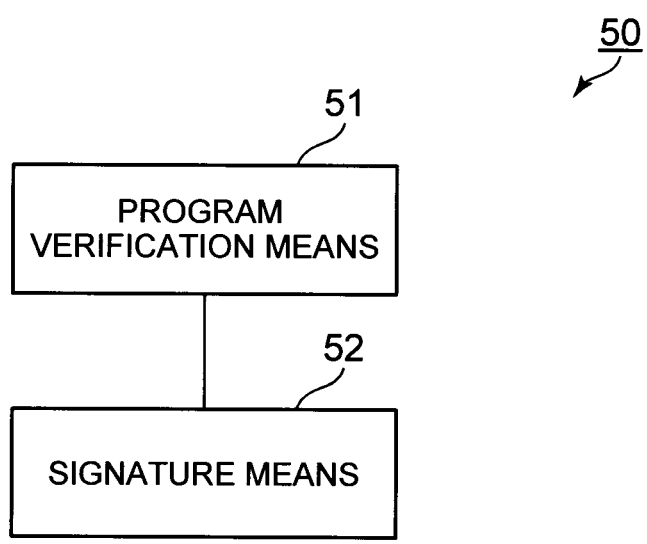

FIG. 12 It depicts a block diagram illustrating an outline of a program verification system 50 of the invention.

Figure 13:
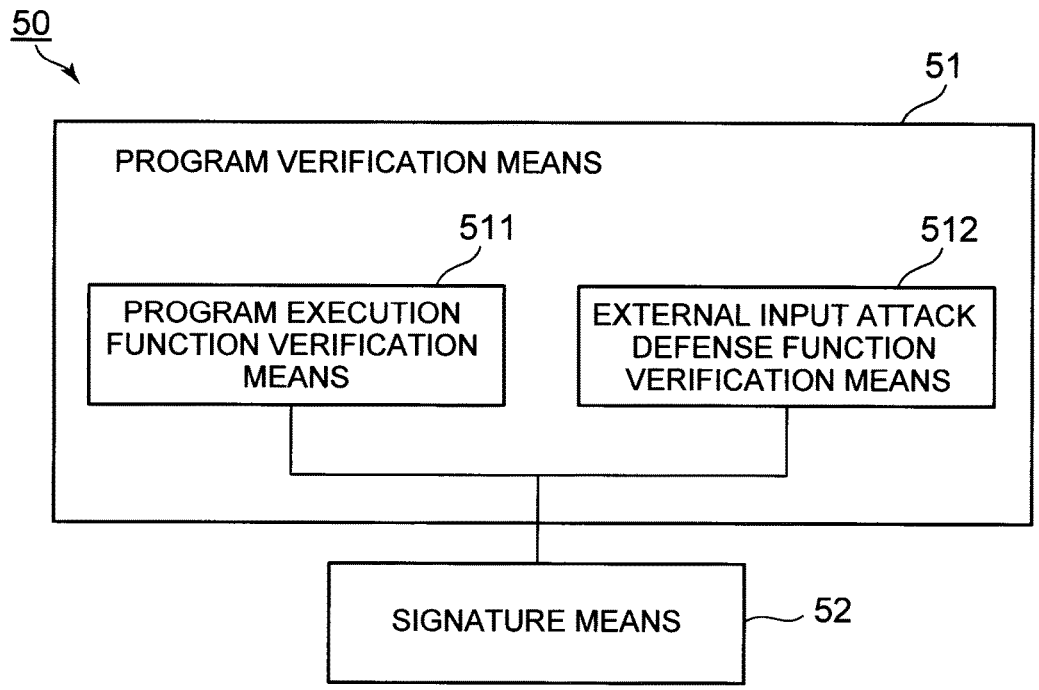

FIG. 13 It depicts a block diagram illustrating another configuration example of the program verification system 50 of the invention.

Figure 14:
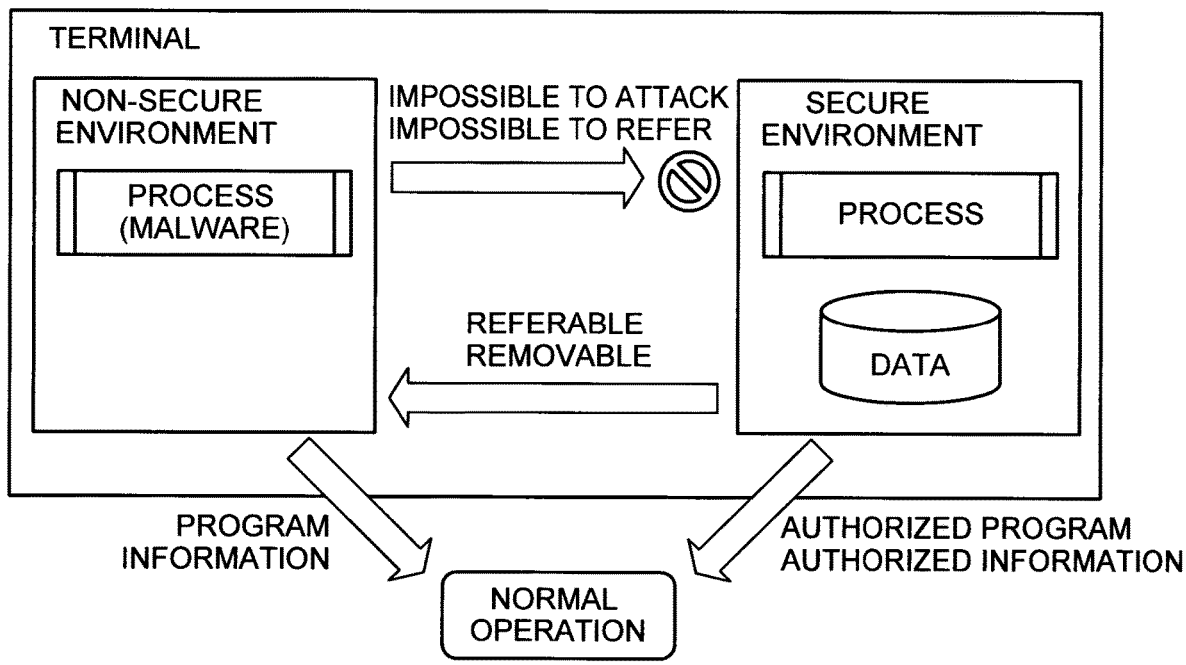

FIG. 14 It depicts a conceptual diagram of a safe execution environment.

Figure 15:
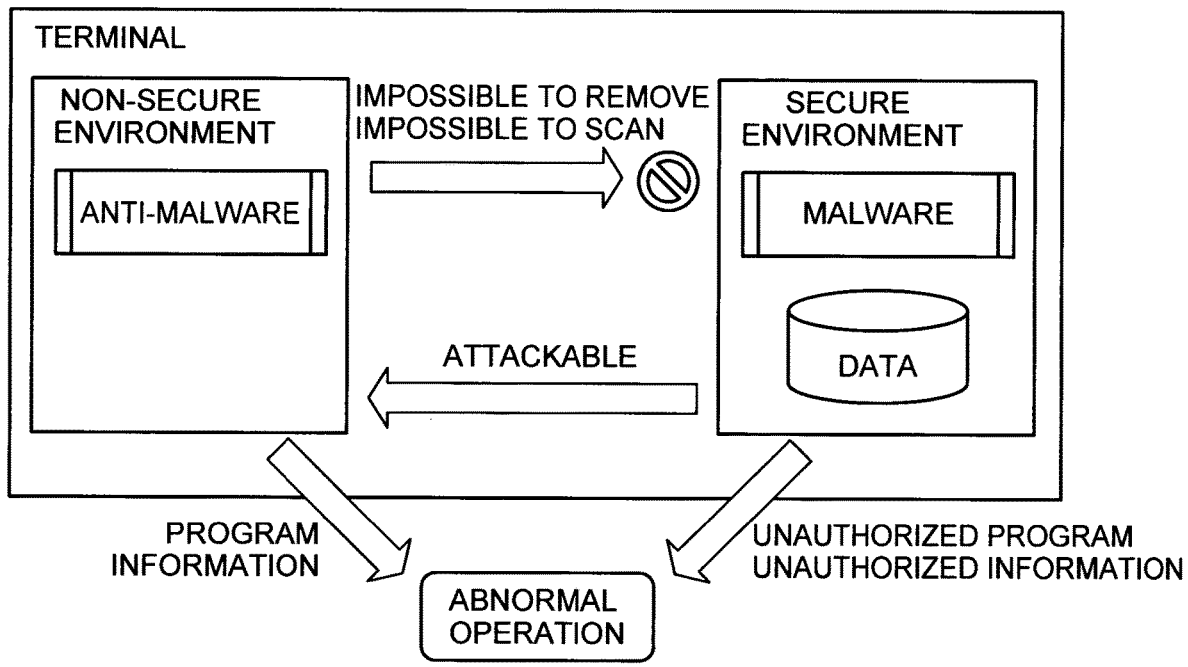

FIG. 15 It depicts a conceptual diagram of an unsafe execution environment (when a secure program is malicious).

Figure 16:
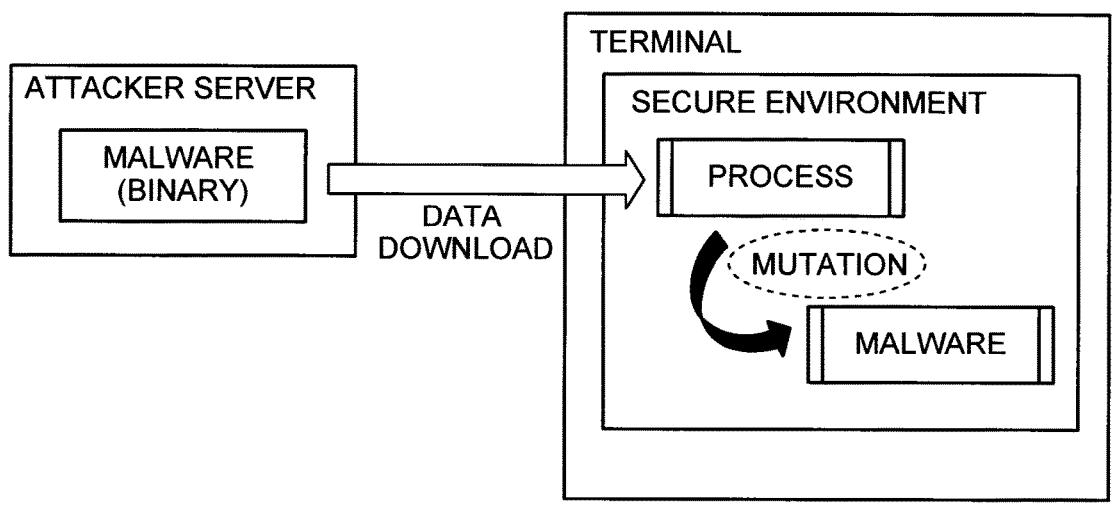

FIG. 16 It depicts an explanatory diagram illustrating an example in which maliciousness unrevealed at the time of verification is revealed during operation.

Figure 17:
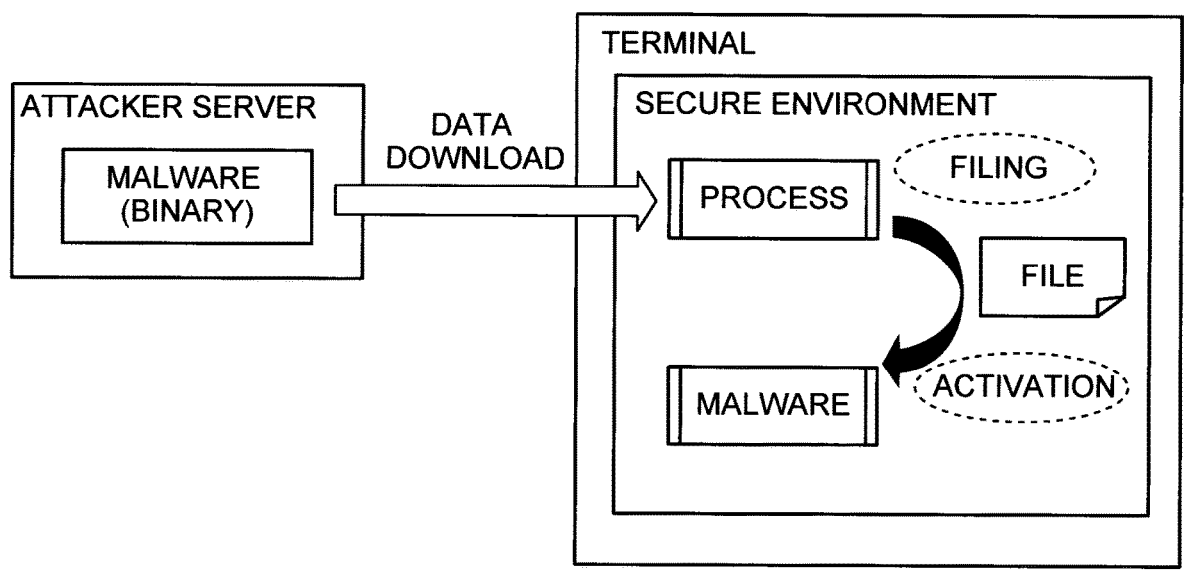

FIG. 17 It depicts an explanatory diagram illustrating an example in which maliciousness unrevealed at the time of verification is revealed during operation.

DESCRIPTION OF EMBODIMENTS

Exemplary Embodiment 1

Figure 1:
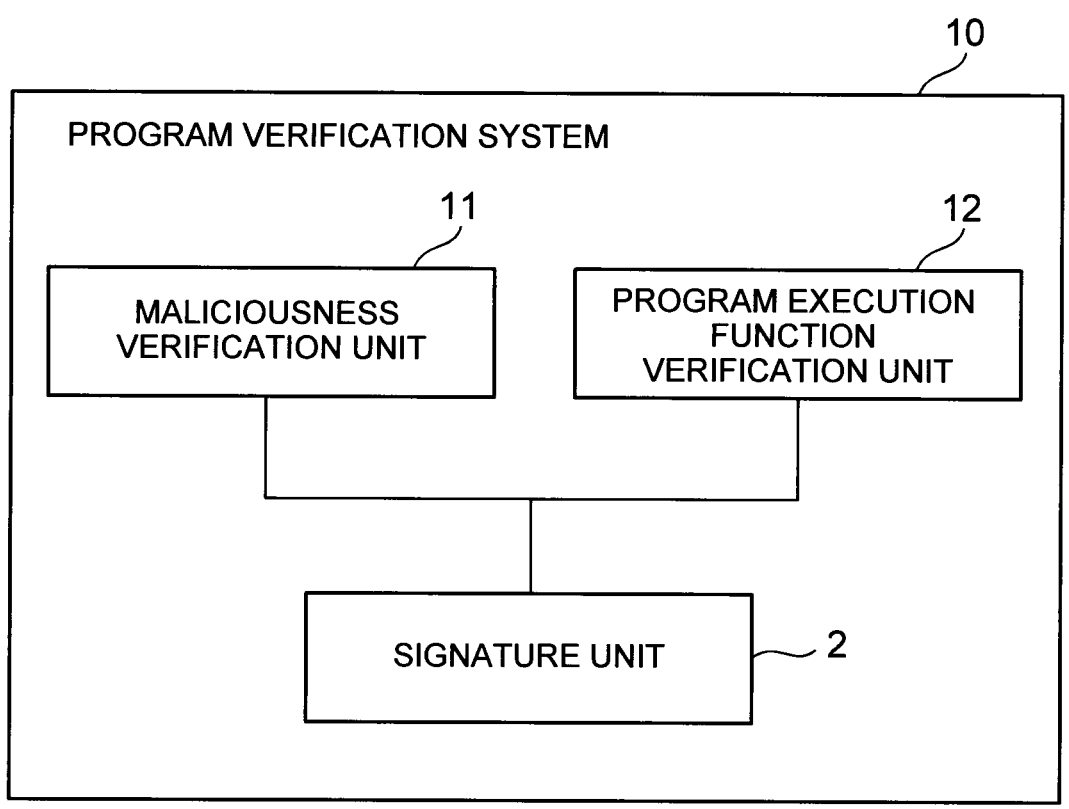
FIG. 1 It depicts a block diagram illustrating a configuration example of a program verification system 10 according to a first exemplary embodiment.

Hereinafter, exemplary embodiments of the invention will be described with reference to the drawings. FIG. 1 is a block diagram illustrating a configuration example of a program verification system 10 according to the first exemplary embodiment. The program verification system 10 illustrated in FIG. 1 includes a maliciousness verification unit 11, a program execution function verification unit 12, and a signature unit 2.

The maliciousness verification unit 11 verifies that a verification target program is not malicious. The program is a description (data) describing instructions for the machine. In general, a machine-readable format is called an execution code, and a human-readable format is called a source code. In addition, "maliciousness" is a code, a use case, an operation method, or the like which intentionally perform an attack, unauthorized access, and information leakage by causing an operation different from the displayed or previously described operation, or issuing a command to perform the operation to a machine.

For example, the maliciousness verification unit 11 can determine the presence or absence of maliciousness using a known method. Specifically, the maliciousness verification unit 11 may input an execution code (set of execution codes) as a verification target program and perform an existing virus check on the execution code. In this case, the maliciousness verification unit 11 may determine the determination result as verification NG (with maliciousness) when a virus is detected, and otherwise determines the determination result as verification OK (without maliciousness).

Further, the maliciousness verification unit 11 may receive an input whether the user has received an explanation about the use case or operation method from the distribution source for the verification target program, and the confirmation result at that time, and determine presence or absence of maliciousness based on the input. In this case, the maliciousness verification unit 11 may determine the determination result as verification NG (with maliciousness) in a case where the user has not received an explanation about the use case or operation method or in a case where as a result, the safety is not confirmed, and otherwise, may determine the determination result as verification OK (without maliciousness).

Further, the maliciousness verification unit 11 may receive an input whether on-boarding with a technical contact (developer or the like) has been performed on the verification target program and the confirmation result at that time, and determine presence or absence of maliciousness based on the input. In this case, the maliciousness verification unit 11 may determine the determination result as verification NG (with maliciousness) in a case where on-boarding has not been performed or in a case where as a result, the safety is not confirmed, and otherwise, may determine the determination result as verification OK (without maliciousness).

The maliciousness verification unit 11 can also be implemented by combining a plurality of the verification methods described above. In this case, the maliciousness verification unit 11 determines the determination result as verification NG (with maliciousness) when at least one result is verification NG and determines the determination result as verification OK (without maliciousness) when all of the results are verification OK.

The program execution function verification unit 12 verifies that the verification target program does not include a program execution function. Here, the program execution function is a function (code) for executing a new program under the same environment (that is, secure environment) according to an instruction in the corresponding program by activating itself or another program in the corresponding program. An example of such a program execution function is the exec system call of C language.

When a new program can be executed derivatively by a secure program under a secure environment, even in a case where the secure program itself is not malicious, malware may be activated from an execution file or the like generated by the corresponding secure program to perform an attack. In the present exemplary embodiment, using such an external data input (from an area other than the secure area), the presence or absence of a code that may cause a malicious program to be executed later (during operation) is confirmed. If there is such a code, it is determined the determination result as verification NG (with program execution function) because there may be maliciousness, and otherwise it is determined the determination result as verification OK (without program execution function).

An example of a method for confirming the presence or absence of a program execution function is analysis by disassembly. The program execution function verification unit 12 may disassemble the execution code of the verification target program, for example, confirm a predetermined register (for example, an AX register storing a system call number) where information on the execution destination is stored, at the time of executing the system call, and confirm whether a prohibited system call is called.

The signature unit 2 performs a signature based on the verification result by the maliciousness verification unit 11 and the verification result by the program execution function verification unit 12. The signature unit 2 performs a signature with respect to the verification target program when all the verification results are OK.

Figure 2:
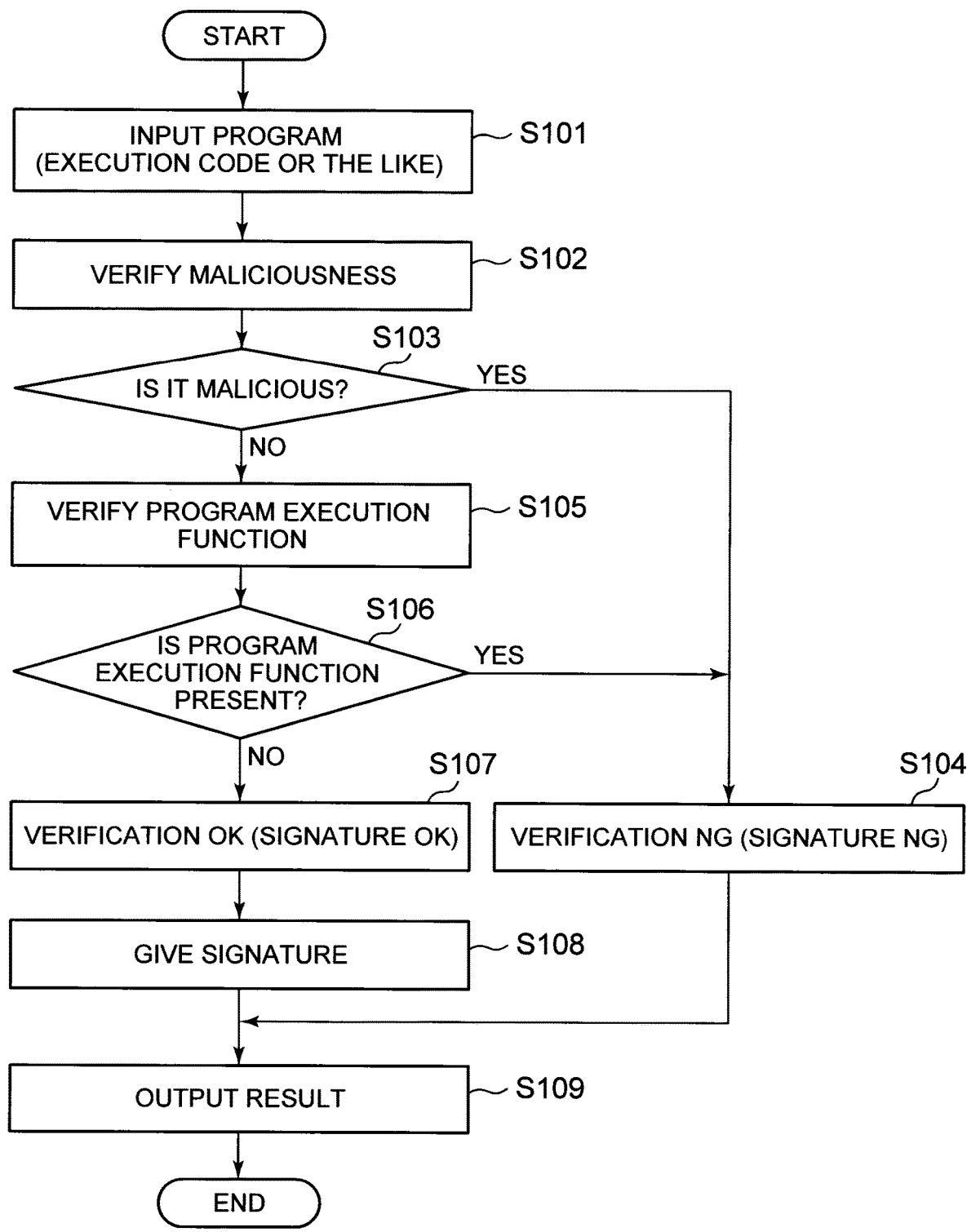
FIG. 2 It depicts a flowchart illustrating an example of the operation of the program verification system 10 of the first exemplary embodiment.

Next, the operation of the present exemplary embodiment will be described. FIG. 2 is a flowchart illustrating an example of the operation of the program verification system 10 of the present exemplary embodiment. In the example illustrated in FIG. 2, first, an input unit (not illustrated) inputs a verification target program (execution code or the like) (step S101).

Next, the maliciousness verification unit 11 verifies the maliciousness of the input verification target program (step S102). In a case where it is determined that the program is malicious as the verification result of the maliciousness (Yes in step S103), the process proceeds to step S104. Otherwise (No in step S103), the process proceeds to step S105.

In step S104, the verification result is set as verification NG, that is, signature NG, and the process proceeds to step S109.

In step S105, the program execution function verification unit 12 verifies the program execution function for the input verification target program. As the verification result of the program execution function, in a case where it is determined that the program execution function is present (Yes in step S106), the process proceeds to step S104, and otherwise (No in step S106), the process proceeds to step S107.

In step S107, the verification result is finally set as verification OK, that is, signature OK, and the process proceeds to step S108.

In step S108, the signature unit 2 gives a signature to the program which is determined as signature OK.

Finally, an output unit (not illustrated) outputs the verification result (verification OK/NG) (step S109). Here, the output unit may output, along with the verification result, the verification target program (program with a signature in case of verification OK), and the details in case of verification NG (which part became NG by which verification method or the like).

Note that the signature of the present exemplary embodiment is used to determine whether to permit placement in the secure environment and whether to permit execution in the secure environment. The user or the protection mechanism of the secure environment permits to place only the execution code signed by the signature unit 2 in the secure environment, and permits execution in the secure environment, for example.

In the above example, an example in which the verification step (S105) of the program execution function is performed after the verification (step S102) of the maliciousness is performed is described, but these verifications are in no particular order. That is, the verification of the program execution function can be performed first, or both the verifications can be performed in parallel.

As described above, according to the present exemplary embodiment, it is determined not only the presence or absence of the (revealed) maliciousness included in the verification target program itself, but also the presence or absence of the program execution function that can be one of the maliciousness that is not revealed, and the signature is added only in a case where safety is confirmed in both respects. By using the signature when determining whether to permit placement in the secure environment and to permit execution in the secure environment, it is possible to prevent in advance that not only a program with revealed maliciousness but also a program containing a code which may execute later a program in which the maliciousness is not seen but which may be malicious by using an external data input or the like are placed in the secure environment or executed in the secure environment. Therefore, it is possible to prevent an attack with maliciousness that becomes revealed in a secure environment.

Note that the program verification system 10 can also set a program determined to be non-malicious based on a general technique as a verification target program of the present exemplary embodiment. In that case, the maliciousness verification unit 11 can be omitted. In such a case, the signature unit 2 may determine the presence or absence of a predetermined signature from a third party given to a program that is determined to be non-malicious based on a general technique, instead of determining the verification result of the maliciousness verification unit 11. The same applies to other exemplary embodiments.

Exemplary Embodiment 2

Figure 3:
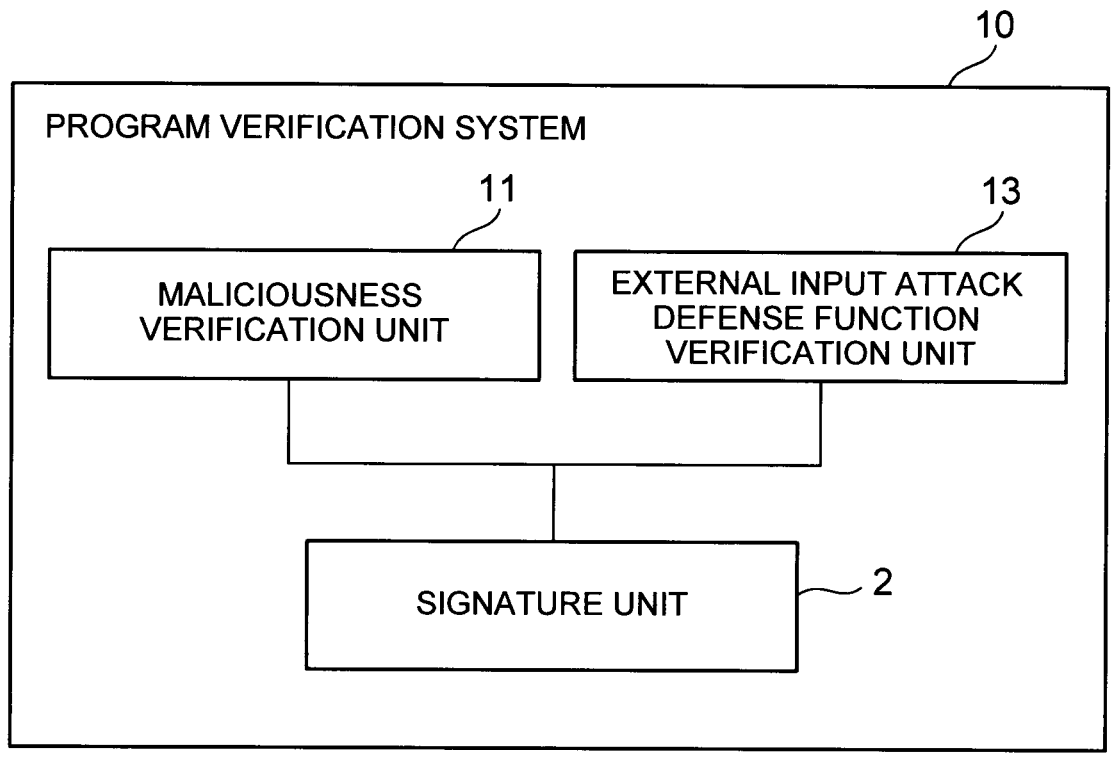
FIG. 3 It depicts a block diagram illustrating a configuration example of a program verification system 10 according to a second exemplary embodiment.

Next, a second exemplary embodiment of the invention will be described. FIG. 3 is a block diagram illustrating a configuration example of a program verification system 10 according to the second exemplary embodiment. The program verification system 10 illustrated in FIG. 3 includes a maliciousness verification unit 11, an external input attack defense function verification unit 13, and a signature unit 2.

The maliciousness verification unit 11 is the same as that in the first exemplary embodiment.

The external input attack defense function verification unit 13 verifies that the external input attack defense function is valid, as a vulnerability mitigation technique, in the protection mechanism of the secure environment or the verification target program. Here, the external input attack defense function is a function that defends against an attack (execution of malicious code, area destruction, or the like) caused by an external data input (particularly, unauthorized data input) during program execution. Examples of the external input attack defense function include a stack protection function and an external code execution prevention function.

The stack protection function is a function for protecting the stack against an external input. Here, the stack is an area for holding data (jump destination) that affects the code to be executed next. Note that the stack protection function may be pre-protection (for example, rewriting prohibition by an external input of the stack) or post-protection (for example, stopping the program when the stack is destroyed by the external input).

The external input attack defense function verification unit 13 determines whether the stack protection function is included in the verification target program in order to prevent, for example, an unauthorized code or unexpected jump to an address (transfer of control). In this case, in a case where the stack protection function is not included, the external input attack defense function verification unit 13 may determine the determination result as verification NG (without external input attack defense function, in particular, without stack protection function), and otherwise, may determine the determination result as verification OK (with external input attack defense function, in particular, with stack protection function).

Specifically, the external input attack defense function verification unit 13 may input an execution code (set of execution codes) as a verification target program and confirm whether a predetermined stack protection function such as canary is implemented in the execution code. In addition, the external input attack defense function verification unit 13 may confirm whether the verification target program includes, as the stack protection function, a handling function (for example, _Stack_chk_fail function ( )) when detecting the stack destruction.

The external code execution prevention function is a function for preventing the execution of codes in an area where rewriting during the operation of the program is permitted (hereinafter, referred to as a dynamic area) such as a stack or a heap area. Here, it does not matter whether the rewriting for the dynamic area is direct or indirect. That is, not only an area where the program (more specifically, an information processing device that operates according to the program) can directly rewrite by specifying the area, but also an area where the program can indirectly rewrite based on the external input are included in the dynamic area.

The external input attack defense function verification unit 13 determines whether the external code execution prevention function is included in verification target program or the protection mechanism of the secure environment so that unauthorized codes input from the outside are not executed. In this case, in a case where the external code execution prevention function is not included in verification target program or the protection mechanism of the secure environment, the external input attack defense function verification unit 13 may determine the determination result as verification NG (without external input attack defense function, in particular, without external code execution prevention function), and otherwise, may determine the determination result as verification OK (with external input attack defense function, in particular, with external code execution prevention function).

Specifically, in a case where the verification target program is an ELF binary, the external input attack defense function verification unit 13 may refer to a flag or the like of the program header, and confirm that there is no execution permission in an area declared as the dynamic area. The external input attack defense function verification unit 13 may confirm that a technique of protecting the dynamic area or preventing data execution in the dynamic area, such as no execute bit (NX bit), Data Execution Prevention (DEP), and Exec-shield, is applied to the protection mechanism of the secure environment.

The following is a specific example of confirmation for the protection mechanism of the secure environment operating on Linux (registered trademark).

Confirm that "NX (Ececute Disable) protection: qctive" is written in the startup log.

Refer to the "/proc/sys/kernerl/exec-shield" file and confirm that the file is "valid".

Note that the confirmation for the protection mechanism of the secure environment is preferably performed on a computer on which the protection mechanism is operating. For example, the program verification system 10 may be a system that operates on a terminal (hereinafter, referred to as a program execution terminal) having a secure environment where a verification target program is placed. In that case, the external input attack defense function verification unit 13 of the program verification system 10 verifies the external input attack defense function before the verification target program is placed in the secure environment or before the verification target program is executed after being placed in the secure environment. The confirmation for the protection mechanism of the secure environment can be performed by a computer other than the program execution terminal being connected to the program execution terminal by remote operation, or performed based on the user's input regarding the execution result on the computer on which the protection mechanism is operating.

The external input attack defense function verification unit 13 can also be implemented by combining a plurality of the verification methods described above. In that case, the external input attack defense function verification unit 13 may determine the determination result as verification OK (with external input attack defense function) in a case where at least one stack protection function and at least one external code execution prevention function are included, for example, and otherwise, determine the determination result as verification NG (without external input attack defense function). The external input attack defense function verification unit 13 may determine the determination result as verification OK in a case where at least one of the stack protection function and the external code execution prevention function is included, and otherwise, determine the determination result as verification NG In addition, for example, a condition for determining the determination result as verification OK is set in advance for a combination of verification methods, and the external input attack defense function verification unit 13 may finally determine the determination result as verification OK or the verification is NG based on the condition according to the combination of verifications to be performed.

Figure 4:
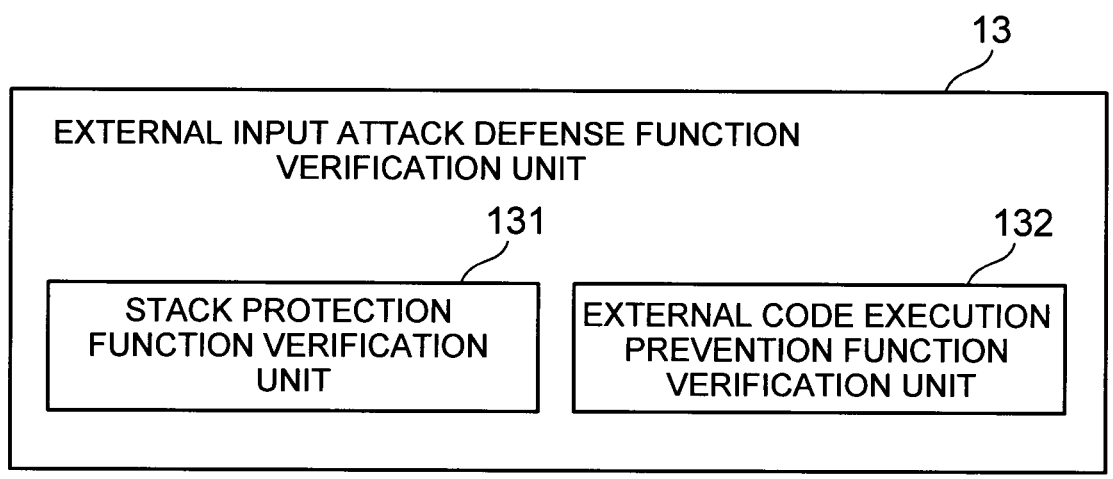
FIG. 4 It depicts a block diagram illustrating a configuration example of an external input attack defense function verification unit 13.

FIG. 4 is a block diagram illustrating a configuration example of the external input attack defense function verification unit 13. As illustrated in FIG. 4, the external input attack defense function verification unit 13 may include a stack protection function verification unit 131 and an external code execution prevention function verification unit 132.

The stack protection function verification unit 131 verifies the stack protection function described above. The external code execution prevention function verification unit 132 verifies the external code execution prevention function described above.

The signature unit 2 performs a signature based on the verification result by the maliciousness verification unit 11 and the verification result by the external input attack defense function verification unit 13. The signature unit 2 performs a signature with respect to the verification target program when all the verification results are OK.

Figure 5:
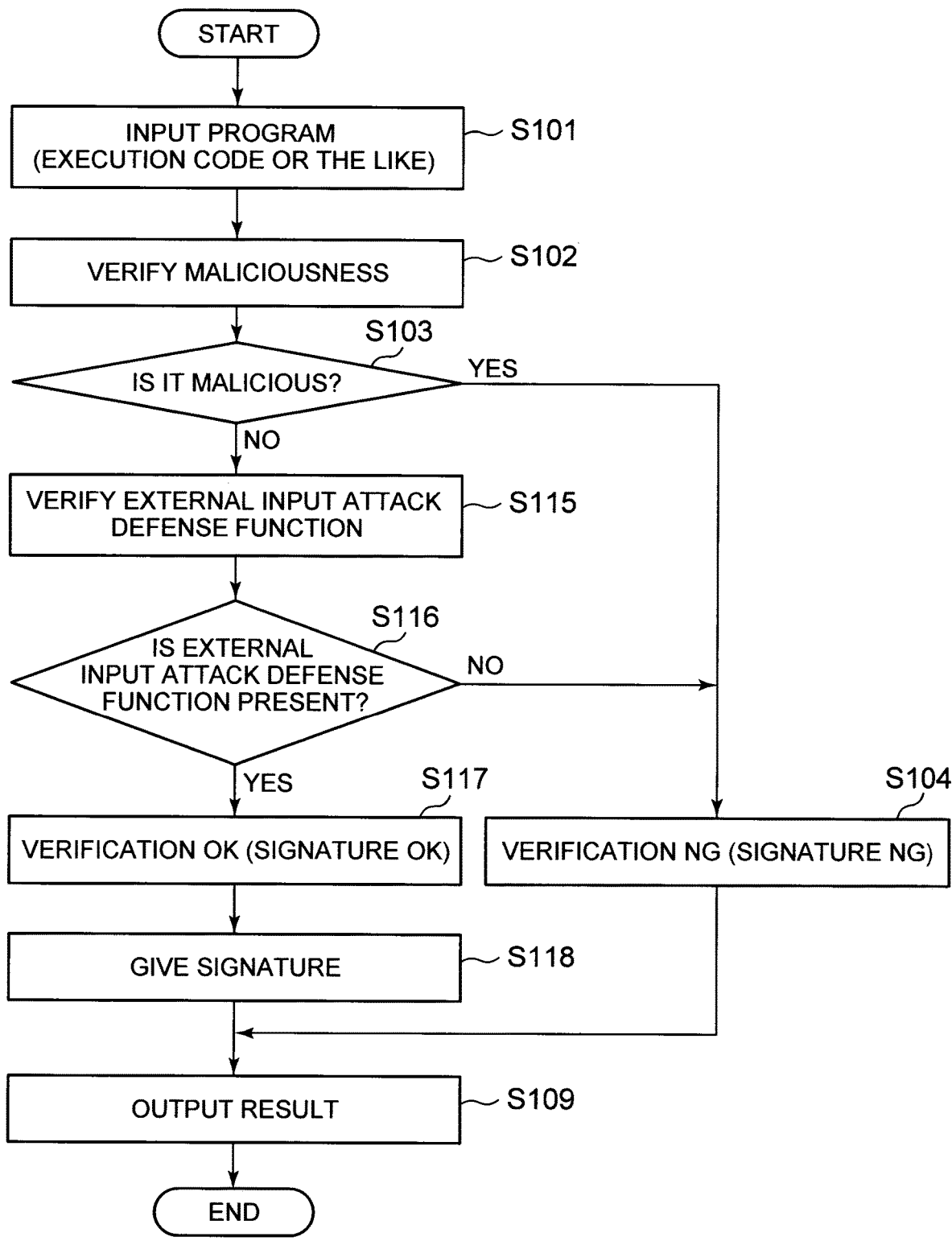
FIG. 5 It depicts a flowchart illustrating an example of the operation of the program verification system 10 of the second exemplary embodiment.

Next, the operation of the present exemplary embodiment will be described. FIG. 5 is a flowchart illustrating an example of the operation of the program verification system 10 of the present exemplary embodiment. Note that steps S101 to S104 and step S109 in this example are the same as those in the first exemplary embodiment.

In the example illustrated in FIG. 5, first, an input unit (not illustrated) inputs a verification target program (execution code or the like) (step S101), and the maliciousness verification unit 11 verifies the maliciousness of the input verification target program (step S102). In a case where it is determined that the program is malicious as the verification result of the maliciousness (Yes in step S103), the process proceeds to step S104. Otherwise (No in step S103), the process proceeds to step S115.

In step S104, the verification result is set as verification NG, that is, signature NG, and the process proceeds to step S109.

In step S115, the external input attack defense function verification unit 13 verifies the external input attack defense function of the input verification target program and/or the protection mechanism of the secure environment. As the verification result of the external input attack defense function, in a case where it is determined that the external input attack defense function is present (Yes in step S116), the process proceeds to step S117, and otherwise (No in step S116), the process proceeds to step S104.

In step S117, the verification result is finally set as verification OK, that is, signature OK, and the process proceeds to step S118.

In step S118, the signature unit 2 gives a signature to the program which is determined as signature OK.

Finally, an output unit (not illustrated) outputs the verification result (verification OK/NG), the program with a signature, the details of the verification result, and the like (step S109).

Note that the signature of the present exemplary embodiment is used to determine whether to permit placement in the secure environment and whether to permit execution in the secure environment.

Further, in the above example, an example in which the verification step (S115) of the external input attack defense is performed after the verification (step S102) of the maliciousness is performed is described, but these verifications are in no particular order. That is, the verification of the external input attack defense can be performed first, or both the verifications can be performed in parallel. Further, the verification of the maliciousness can be omitted as in the first exemplary embodiment.

As described above, according to the present exemplary embodiment, it is determined not only the presence or absence of the (revealed) maliciousness included in the verification target program itself, but also the presence or absence of the function (external input attack defense function) of defensing against an attack by an external input, which is one of the maliciousness that is not revealed, and the signature is added only in a case where safety is confirmed in both respects. By using the signature when determining whether to permit placement in the secure environment and to permit execution in the secure environment, it is possible to prevent in advance that not only a program with revealed maliciousness but also a program in which the maliciousness is not seen but which may be malicious to attack by an external data input or the like is placed in the secure environment or executed in the secure environment. Therefore, it is possible to prevent an attack with maliciousness that becomes revealed in a secure environment.

Exemplary Embodiment 3

Figure 6:
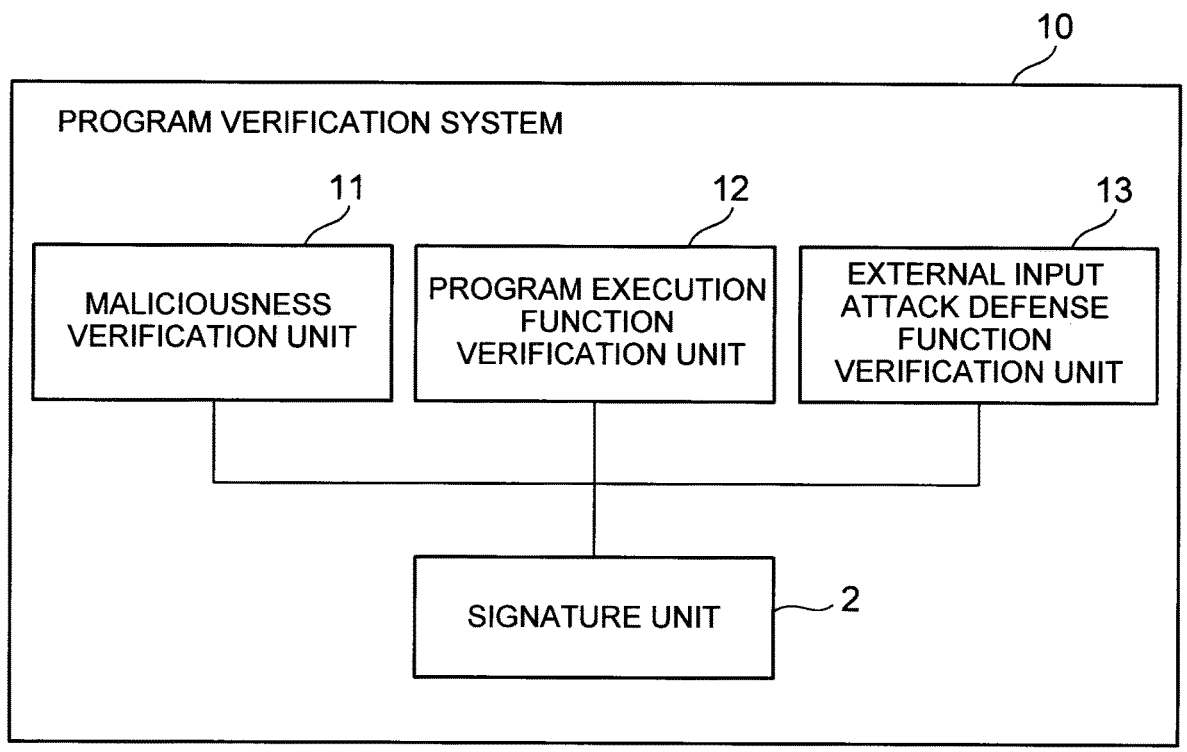
FIG. 6 It depicts a block diagram illustrating a configuration example of a program verification system 10 according to a third exemplary embodiment.

Next, a third exemplary embodiment of the invention will be described. FIG. 6 is a block diagram illustrating a configuration example of the program verification system 10 according to the third exemplary embodiment. The program verification system 10 illustrated in FIG. 6 includes the maliciousness verification unit 11, the program execution function verification unit 12, the external input attack defense function verification unit 13, and the signature unit 2. This example is a combination of the first exemplary embodiment and the second exemplary embodiment.

The maliciousness verification unit 11 and the program execution function verification unit 12 are the same as those in the first exemplary embodiment. The external input attack defense function verification unit 13 is the same as that in the second exemplary embodiment.

The signature unit 2 of the present exemplary embodiment performs a signature based on the verification result by the maliciousness verification unit 11, the verification result by the program execution function verification unit 12, and the verification result by the external input attack defense function verification unit 13. The signature unit 2 performs a signature with respect to the verification target program when all the verification results are OK.

Figure 7:
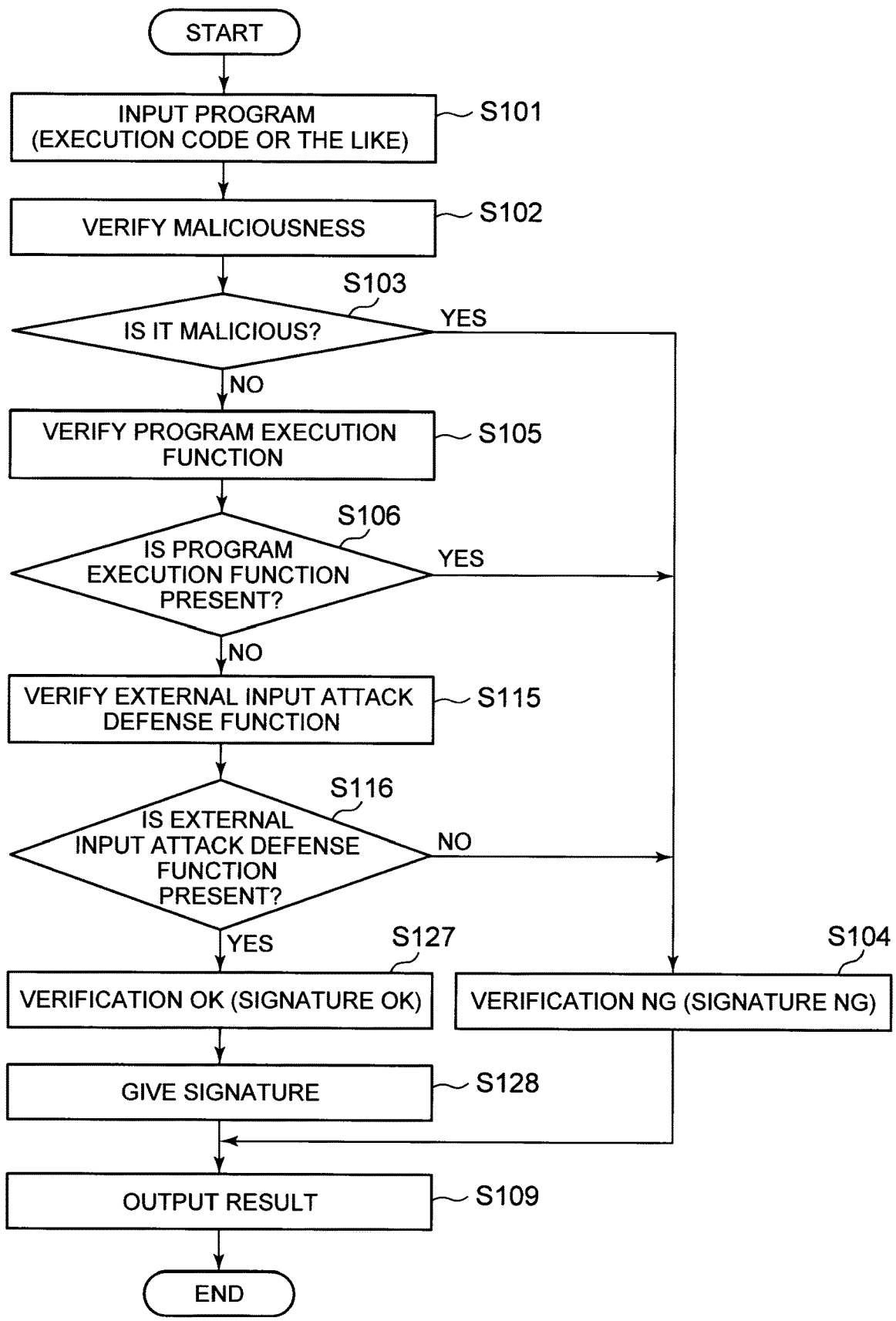

Next, the operation of the present exemplary embodiment will be described. FIG. 7 is a flowchart illustrating an example of the operation of the program verification system 10 of the present exemplary embodiment. Note that steps S101 to S104 and step S109 in this example are the same as those in the first exemplary embodiment, steps S115 and S116 in this example are the same as those in the second exemplary embodiment, and thus the description thereof is omitted.

In the present exemplary embodiment, when the verification target program (execution code or the like) is input, first, the maliciousness verification unit 11 verifies the maliciousness of the input verification target program (step S102 and subsequent steps). Thereafter, the program execution function verification unit 12 verifies the program execution function of the input verification target program (steps S105 and subsequent steps). Thereafter, the external input attack defense function verification unit 13 verifies the external input attack defense function of the input verification target program and/or the protection mechanism of the secure environment (step S115 and subsequent steps).

Then, in response to these results, the signature unit 2 gives a signature to the program which is determined as signature OK (steps S127 and S128). Specifically, the signature unit 2 determines the determination result as verification OK (step S127) when all of the verification results of the malicious verification, the verification of the program execution function, and the verification of the external input attack defense are OK, and gives a signature to the verification target program (step S128).

Finally, an output unit (not illustrated) outputs the verification result (verification OK/NG), the program with a signature, the details of the verification result, and the like (step S109).

In the above example, an example in which the verification step (S105) of the program execution function is performed after the verification (step S102) of the maliciousness is performed, and then the verification of the external input attack defense is performed is described, but these verifications are in no particular order. Further, the program verification system 10 can also select a verification method to be performed according to, for example, a user's instruction or a setting file.

As described above, according to the present exemplary embodiment, it is determined not only the presence or absence of the (revealed) maliciousness included in the verification target program itself, but also the presence or absence of the program execution function which is one of the maliciousness that is not revealed and/or the presence or absence of the function of defensing against an attack by an external input, which is one of the maliciousness that is not revealed, and the signature is added only in a case where safety is confirmed in every determination. By using the signature when determining whether to permit placement in the secure environment and to permit execution in the secure environment, it is possible to prevent in advance that not only a program with revealed maliciousness but also a program containing a code which may execute later a program in which the maliciousness is not seen but which may be malicious by using an external data input or the like are placed in the secure environment or executed in the secure environment. Therefore, it is possible to prevent an attack with maliciousness that becomes revealed in a secure environment.

FIG. 8 is an example of applying the program verification system 10 of the present exemplary embodiment to the program execution terminal. A program execution terminal 300 illustrated in FIG. 8 includes a secure environment 310. In the secure environment 310, the maliciousness verification unit 11, the program execution function verification unit 12, and the external input attack defense function verification unit 13 are provided as a program verification unit 10A, and the signature unit 2 and a placement/execution unit 3 are provided.

The placement/execution unit 3 determines whether a signature is given by the signature unit 2 when placing the program in the secure environment 310 or executing the program in the secure environment 310, and in a case where the signature is given, the placement/execution unit 3 places or executes the program.

FIG. 9 is another configuration example of the program verification system 10 of the present exemplary embodiment. The program verification system 10 illustrated in FIG. 9 includes a source input unit 41, a determination unit 42, an external input attack defense function giving unit 43, a build unit 44, and an execution code output unit 45 in addition to the elements of the program verification system 10 of the third exemplary embodiment.

The source input unit 41 inputs a source code before compilation as the verification target program.

The maliciousness verification unit 11 and the program execution function verification unit 12 are the same as those in the first exemplary embodiment. The external input attack defense function verification unit 13 is the same as that in the second exemplary embodiment. If an execution code is required as the verification target program in each verification, the source code is input to the build unit 44 and a series of processes including compilation (preprocessing, compilation, linking, and the like) is performed to obtain the execution code.

The determination unit 42 determines the verification result by the maliciousness verification unit 11, the verification result by the program execution function verification unit 12, and the verification result by the external input attack defense function verification unit 13, and in a case where all of the verification results are determined as verification OK, the source code is input to the build unit 44 to generate the execution code. In a case where the execution code has already been generated, the execution code is input to the signature unit 2 to give a signature. The determination of whether the result is signature OK may be the same as the determination process of the signature unit 2 in the first to third exemplary embodiments.

If the determination unit 42 determines the verification result by the external input attack defense function verification unit 13 as verification NG, the source code is input to the external input attack defense function giving unit 43 to give an external input attack defense function.

In addition, in a case where there is a verification method in which the verification result is verification NG, the determination unit 42 may output the fact indicating verification NG and details of the verification result.

The external input attack defense function giving unit 43 gives an external input attack defense function to the input source code. The external input attack defense function giving unit 43, for example, additionally gives the stack protection function or the external code execution prevention function as described above to the input source code and outputs the source code. Specifically, the external input attack defense function giving unit 43 may insert a code for implementing such a stack protection function in the source code. For example, in the protection mechanism of the secure environment where the verification target program is placed, in a case where the external code execution prevention function is invalid, the external input attack defense function giving unit 43 may make the external code execution prevention function valid.

The build unit 44 performs a series of build processes including compilation on the input source code. More specifically, the build unit 44 analyzes the input source code, converts the input source code into a machine language, and generates the execution code.

The signature unit 2 gives a signature to the execution code obtained from the source code determined as signature OK by the determination unit 42.

The execution code output unit 45 outputs the execution code to which the signature unit 2 has given the signature.

FIG. 10 is a flowchart illustrating an example of the operation of the program verification system 10 of the exemplary embodiment illustrated in FIG. 9. In the example illustrated in FIG. 10, first, the source input unit 41 inputs the source code of the verification target program (step S201).

Next, the maliciousness verification unit 11 verifies the maliciousness of the input verification target program (source code) (step S202). The malicious verification method may be the same as that in the above exemplary embodiment. In a case where it is determined that the program is malicious as the verification result of the maliciousness (Yes in step S203), the process proceeds to step S204. Otherwise (No in step S203), the process proceeds to step S205.

In step S204, the details of the failure are output as a build failure (error code: verification NG), and the process ends.

In step S205, the program execution function verification unit 12 verifies the program execution function. The method of verifying the program execution function may be the same as that in the above exemplary embodiment. As the verification result of the program execution function, in a case where it is determined that the program execution function is present (Yes in step S206), the process proceeds to step S204, and otherwise (No in step S206), the process proceeds to step S207.

In step S207, the external input attack defense function verification unit 13 verifies the external input attack defense function. The method of verifying the external input attack defense function may be the same as that in the above exemplary embodiment. As the verification result of the external input attack defense function, in a case where it is determined that the external input attack defense function is present (Yes in step S208), the process proceeds to step S210, and otherwise (No in step S208), the process proceeds to step S209.

In this example, the determinations of steps S203, S206, and S208 are performed by the determination unit 42.

In step S209, the external input attack defense function giving unit 43 gives an external input attack defense function to the input source code. Thereafter, the process returns to step S207.

In step S210, the build unit 44 analyzes the input source code and generates the execution code.

Next, the signature unit 2 gives a signature to the generated execution code (step S211).

Finally, the execution code output unit 45 outputs the execution code with a signature (step S212).

As in the configuration illustrated in FIG. 9, the program verification system 10 can perform not only the verification but also give a lacking function as the verification result.

In FIGS. 8 and 9, as the program verification unit 10A, an example in which the maliciousness verification unit 11, the program execution function verification unit 12, and the external input attack defense function verification unit 13 are included as the program verification unit 10A is illustrated, but it is sufficient that the verification unit 10A includes at least the program execution function verification unit 12 and the external input attack defense function verification unit 13.

Next, a configuration example of a computer according to each exemplary embodiment of the invention will be described. FIG. 11 is a schematic block diagram illustrating a configuration example of a computer according to each exemplary embodiment of the invention. A computer 1000 includes a CPU 1001, a main storage device 1002, an auxiliary storage device 1003, an interface 1004, a display device 1005, and an input device 1006.

The program verification system of each exemplary embodiment described above may be implemented in the computer 1000. In that case, the operation of the program verification system may be stored in the auxiliary storage device 1003 in a program format. The CPU 1001 reads out a program from the auxiliary storage device 1003 and develops the program in the main storage device 1002, and executes a predetermined process in each exemplary embodiment according to the program. The CPU 1001 is an example of an information processing device that operates according to a program, and may include, for example, a micro processing unit (MPU), a memory control unit (MCU), and a graphics processing unit (GPU), in addition to the central processing unit (CPU).

The auxiliary storage device 1003 is an example of a non-temporary tangible medium. Other examples of the non-temporary tangible medium include a magnetic disk, a magneto-optical disk, a CD-ROM, a DVD-ROM, and a semiconductor memory connected via the interface 1004. In a case where this program is distributed to the computer 1000 via a communication line, the computer 1000 that has received the distribution may develop the program in the main storage device 1002 to execute the predetermined processing in each exemplary embodiment.

The program may be for realizing a part of the predetermined process in each exemplary embodiment. Furthermore, the program may be a difference program that realizes the predetermined process in each exemplary embodiment in combination with another program already stored in the auxiliary storage device 1003.

The interface 1004 transmits and receives information to and from other devices. The display device 1005 presents information to the user. The input device 1006 receives an input of information from the user.

Further, depending on the processing content in the exemplary embodiment, some elements of the computer 1000 may be omitted. For example, if the program verification system does not present information to the user, the display device 1005 can be omitted.

In addition, some or all of the components of each device are implemented by a general-purpose or dedicated circuit (circuitry), a processor, or a combination thereof. These may be constituted by a single chip or may be constituted by a plurality of chips connected via a bus. Moreover, some or all of the components of each device may be implemented by a combination of the above-described circuit and the like and a program.

In a case where some or all of the components of each device are implemented by a plurality of information processing devices and circuits, the plurality of information processing devices and circuits may be arranged in a centralized manner or in a distributed manner. For example, the information processing device, the circuit, and the like may be implemented as a form of being connected via a communication network, such as a client and server system and a cloud computing system.

Next, the outline of the invention will be described. FIG. 12 is a block diagram illustrating the outline of a program verification system 50 of the invention. The program verification system 50 illustrated in FIG. 12 includes program verification means 51 and signature means 52.

The program verification means 51 (for example, the program execution function verification unit 12, the external input attack defense function verification unit 13, the program verification unit 10A) verifies whether the verification target program input as a program operating in a secure environment does not include a program execution function which is a function of executing a new program in the same environment by a command in the corresponding program and/or whether the verification target program or the protection mechanism of the secure environment as the operation source of the verification target program includes an external input attack defense function which is a function of defending against an attack caused by an external data input during the execution of the program.

The signature means 52 (for example, the signature unit 2) gives a signature to the program based on the verification result by the program verification means 51.

With such a configuration, it is possible to prevent an attack with maliciousness that becomes revealed in a secure environment.

FIG. 13 is a block diagram illustrating another configuration example of the program verification system 50 of the invention. As illustrated in FIG. 13, the program verification means 51 may include program execution function verification means 511 and external input attack defense function verification means 512.

The program execution function verification means 511 (for example, the program execution function verification unit 12) verifies whether the verification target program input as a program operating in a secure environment does not include a program execution function which is a function of executing a new program in the same environment by a command in the corresponding program.

The external input attack defense function verification means 512 (for example, the external input attack defense function verification unit 13) verifies whether the verification target program or the protection mechanism of the secure environment as the operation source of the verification target program includes an external input attack defense function which is a function of defending against an attack caused by an external unauthorized data input during the execution of the program.

While the present invention has been described with reference to the present exemplary embodiment and examples, the present invention is not limited to the above exemplary embodiment and examples. The configurations and details of the present invention can be modified in various ways that can be understood by those skilled in the art within the scope of the present invention.

INDUSTRIAL APPLICABILITY

The invention can be suitably applied when a robust execution environment is desired, without being limited to the secure environment.

REFERENCE SIGNS LIST

10 Program verification system
10A Program verification unit
11 Maliciousness verification unit
12 Program execution function verification unit
13 External input attack defense function verification unit
131 Stack protection function verification unit
132 External code execution prevention function verification unit
2 Signature unit
300 Program execution terminal
310 Secure environment
3 Placement/execution unit
41 Source input unit
42 Determination unit
43 External input attack defense function giving unit
44 Build unit
45 Execution code output unit
1000 Computer
1001 CPU
1002 Main storage device
1003 Auxiliary storage device
1004 Interface
1005 Display device
1006 Input device
50 Program verification system
51 Program verification means
511 Program execution function verification means
512 External input attack defense function verification means
52 Signature means

The invention claimed is:

1. A program verification system comprising:
a processor; and
a memory storing instructions executable by the processor to:
verify whether a verification target program input as a program operating in a secure environment does not include a program execution function which is a function of executing a new program in a same environment by a command in a corresponding program and whether the verification target program or a protection mechanism of the secure environment as an operation source of the verification target program includes an external input attack defense function which is a function of defending against an attack caused by an external unauthorized data input during execution of the verification target program; and
give a digital signature to the verification target program based on a verification result,
wherein the instructions are executable by the processor to further
verify whether the verification target program input as the program operating in the secure environment does not include the program execution function which is the function of executing the new program in the same environment by the command in the corresponding program to obtain a first verification result, and
verify whether the verification target program or the protection mechanism of the secure environment as the operation source of the verification target program includes the external input attack defense function which is the function of defending against the attack caused by the external unauthorized data input during execution of the verification target program to obtain a second verification result, and give the digital signature to the verification target program in response to both (i) the first verification result indicating the verification target program input as the program operating in the secure environment does not include the program execution function which is the function of executing the new program in the same environment by the command in the corresponding program and (ii) the second verification result indicating the verification target program or the protection mechanism of the secure environment as the operation source of the verification target program includes the external input attack defense function which is the function of defending against the attack caused by the external unauthorized data input during execution of the verification target program.

2. The program verification system according to claim 1, wherein the instructions are executable by the processor to further confirm that the verification target program does not include a system call causing a machine to execute the new program.

3. The program verification system according to claim 1, wherein the instructions are executable by the processor to further confirm that the verification target program includes a stack protection function, or the verification target program or the protection mechanism of the secure environment as the operation source of the verification target program includes an external code execution prevention function which is a function of preventing execution of a code in a dynamic area as an area where rewriting during an operation of the verification target program is permitted.

4. The program verification system according to claim 3, wherein the instructions are executable by the processor to further
determine a result as verification OK in response to the stack protection function or the external code execution prevention function being included.

5. The program verification system according to claim 3, wherein the stack protection function includes post-protection against an external input to a stack.

6. The program verification system according to claim 1, wherein the instructions are executable by the processor to further
perform verification on the verification target program of which safety is confirmed by a predetermined verification for at least a code before execution, a use case, and/or an operation method.

7. The program verification system according to claim 1, wherein the instructions are executable by the processor to further:
input a source code of the verification target program;
give the external input attack defense function to the source code; and
convert the source code to an execution code in a machine language,
wherein the processor verifies the source code,
the processor gives the external input attack defense function in response to the external input attack defense function not being included in the source code based on a source code verification result, and
the processor gives the digital signature to the execution code after conversion of the source code to the execution code, based on the source code verification result.

8. A program verification method, by an information processing device, comprising:
a first process of verifying whether a verification target program input as a program operating in a secure environment does not include a program execution function which is a function of executing a new program in a same environment by a command in a corresponding program and whether the verification target program or a protection mechanism of the secure environment as an operation source of the verification target program includes an external input attack defense function which is a function of defending against an attack caused by an external unauthorized data input during execution of the verification target program; and
a second process of giving a digital signature to the verification target program based on a verification result,
wherein the first process comprises:
verifying whether the verification target program input as the program operating in the secure environment does not include the program execution function which is the function of executing the new program in the same environment by the command in the corresponding program to obtain a first verification result, and
verifying whether the verification target program or the protection mechanism of the secure environment as the operation source of the verification target program includes the external input attack defense function which is the function of defending against the attack caused by the external unauthorized data input during execution of the verification target program to obtain a second verification result, and
the second process comprises:
giving the digital signature to the verification target program in response to both (i) the first verification result indicating the verification target program input as the program operating in the secure environment does not include the program execution function which is the function of executing the new program in the same environment by the command in the corresponding program and (ii) the second verification result indicating the verification target program or the protection mechanism of the secure environment as the operation source of the verification target program includes the external input attack defense function which is the function of defending against the attack caused by the external unauthorized data input during execution of the verification target program.

9. A non-transitory computer-readable recording medium in which a program verification program is recorded, the program verification program when executed causing a computer to execute:
a first process of verifying whether a verification target program input as a program operating in a secure environment does not include a program execution function which is a function of executing a new program in a same environment by a command in a corresponding program and whether the verification target program or a protection mechanism of the secure environment as an operation source of the verification target program includes an external input attack defense function which is a function of defending against an attack caused by an external unauthorized data input during execution of the verification target program; and a second process of giving a digital signature to the verification target program based on a verification, wherein, in the first process, the program verification program causes the computer to execute:

verifying whether the verification target program input as the program operating in the secure environment does not include the program execution function which is the function of executing the new program in the same environment by the command in the corresponding program, and verifying whether the verification target program or the protection mechanism of the secure environment as the operation source of the verification target program includes the external input attack defense function which is the function of defending against the attack caused by the external unauthorized data input during execution of the verification target program, and, in the second process, the program verification program causes the computer to execute:

giving the digital signature to the verification target program in response to both (i) the first verification result indicating the verification target program input as the program operating in the secure environment does not include the program execution function which is the function of executing the new program in the same environment by the command in the corresponding program and (ii) the second verification result indicating the verification target program or the protection mechanism of the secure environment as the operation source of the verification target program includes the external input attack defense function which is the function of defending against the attack caused by the external unauthorized data input during execution of the verification target program.

* * * * *